M. R. GRUENDER.
AUTO SIGNAL.
APPLICATION FILED DEC. 30, 1919.
1,399,615.
Patented Dec. 6, 1921.
2 SHEETS—SHEET 1.
Fig. 1.
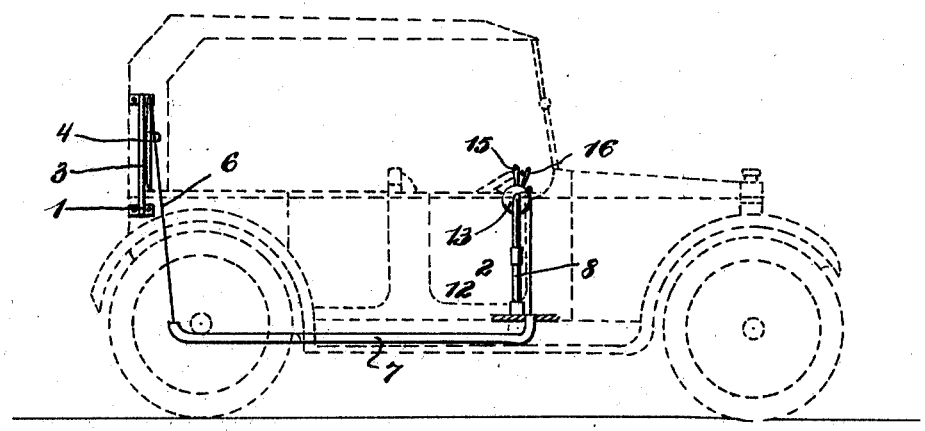
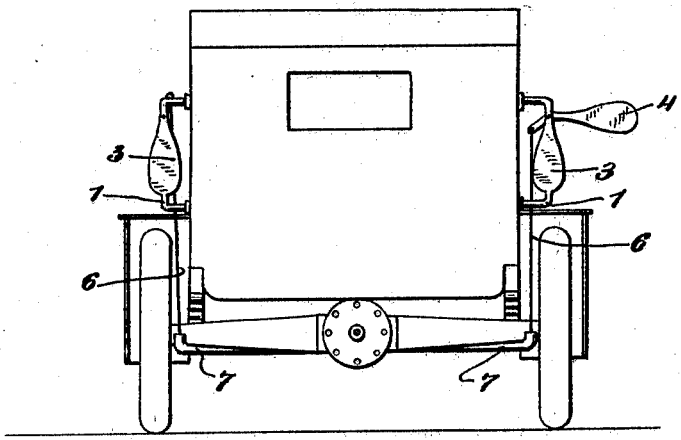
Fig. 2.
WITNESS:
Benj. Rahn
INVENTOR.
M. R. Gruender
BY
Victor J. Evans ATTORNEY.

M. R. GRUENDER.
AUTO SIGNAL.
APPLICATION FILED DEC. 30, 1919.

1,399,615.

Patented Dec. 6, 1921.
2 SHEETS—SHEET 2.

WITNESS:
Benj. Kahn

INVENTOR.
M. R. Gruender
BY
Victor J. Evans ATTORNEY.

UNITED STATES PATENT OFFICE.

MAX R. GRUENDER, OF MILWAUKEE, WISCONSIN.

AUTO-SIGNAL.

1,399,615. Specification of Letters Patent. Patented Dec. 6, 1921.

Application filed December 30, 1919. Serial No. 348,363.

*To all whom it may concern:*

Be it known that I, MAX R. GRUENDER, a citizen of the United States, residing at Milwaukee, in the county of Milwaukee and State of Wisconsin, have invented new and useful Improvements in Auto-Signals, of which the following is a specification.

This invention relates to improvements in automobile signals and the principal object of the invention is to provide means for indicating to other vehicles the intentions of the driver to turn so that it will be unnecessary for him to hold out his hand.

Another object of the invention is to provide means located adjacent the driver's seat for operating the signal which is placed at the rear of the automobile.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic view showing my invention in use on an automobile.

Fig. 2 is a view showing part of the rear end of an automobile with a pair of signals thereon.

Figure 3:
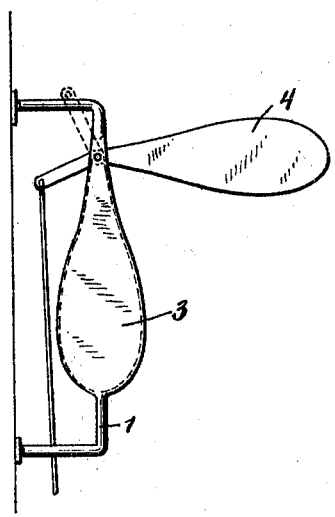
Fig. 3 is a side view of one of the signals and its supporting frame.
Figure 4:
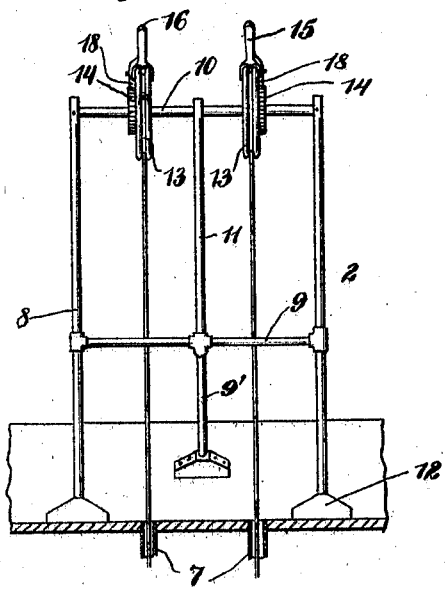
Fig. 4 is an enlarged view of the supporting frame and the means carried thereby for operating the signals.
Figure 5:
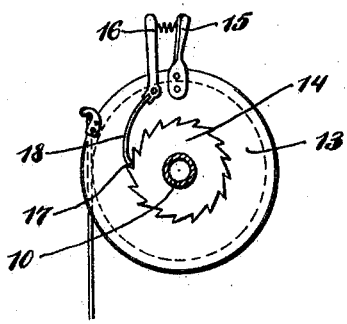
Fig. 5 is an enlarged view of one of the operating drums.

As shown in these views a pair of signal supporting frames are suitably attached to the rear of the automobile and a frame 2 is placed in the automobile adjacent the driver's seat and this frame supports the operating means for the signals.

Each of the frames 1 is provided with an enlarged part 3 for hiding the signal arm 4, when the said arm is not in use. This arm is of substantially paddle shape and may be colored red so as to attract attention. Its stem is pivoted to the frame 5, so that said arm will occupy a position behind the large part 3 by the action of gravity. A cable 6 is attached to the upper end of the stem of the arm above its pivotal point so that when said cable is pulled the arm will be swung to occupy a position at right angles to the frame so that it may be readily seen by anyone to the rear of the automobile. Thus the cable 6 passes through a tubing 7, which is suitably attached to the under part of the automobile and the front end of this tubing passes through the floor of the automobile at a point in front of the driver's seat.

At this point the frame 2 is situated and this frame is formed of tubing and consists of the uprights 8, central cross-piece 9 and the upper cross-piece 10. The cross-pieces are connected together by the centrally located brace 11. The lower ends of the uprights 8 are secured to the base pieces 12 which are adapted to be secured to the floor. 9' indicates the brace which is connected with the cross-piece 9 and is adapted to be secured to a part of the automobile. Rotatably mounted on the cross-piece 10 is a pair of drums 13 and adjacent each drum and fixed to the cross-piece is an annular rack 14. Each drum is provided with a handle 15 and a small lever 16 is pivoted to the drum and lies adjacent the handle so that when the handle is grasped its lever will be grasped also. A dog 17 is pivotally arranged on the drum and is normally in engagement with the annular rack. This dog is connected with the lever 16 by a spring 18 in such a manner that when the lever is grasped by the hand and pulled toward the handle the dog will be released from the ratchet and thus permit the drum to be turned. Each drum is grooved so as to receive the cable 6.

If desired the drums may be inclosed in a casing which is slotted to permit the handle 15 to project therefrom.

It will thus be seen that when the driver wishes to make a turn before reaching the turning point he seizes the handle of the drum to which is attached the cable leading to the desired signal. By pulling this drum toward him the cable is wound thereupon and thus the signal arm is raised. After he makes the turn the drum is turned back to its original position and the weight of the signal arm will cause the same to drop and take up the slack in the cable. If the driver is to make a left hand turn he would operate the signal on the left side of the automobile and if he is to make a right hand turn he operates the other signal.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A signal operating mechanism, the combination of a frame including a cross piece, a pair of spaced drums rotatably mounted on the cross piece of said frame, a cable connected with each drum, a handle on each drum for rotating the same, ratchet mechanism for holding the drums in adjusted positions, and a lever pivoted to each drum and yieldingly connected with the handle for releasing said ratchet mechanism.

In testimony whereof I affix my signature.

MAX R. GRUENDER.